US009042871B2

(12) United States Patent
Liu

(10) Patent No.: US 9,042,871 B2
(45) Date of Patent: May 26, 2015

(54) MODE SWITCHING AND ELECTRONIC SIGN-IN SYSTEM FOR MOBILE DEVICE AND METHOD THEREOF

(71) Applicants: INVENTEC (PUDONG) TECHNOLOGY CORPORATION, Shanghai (CN); INVENTEC CORPORATION, Taipei (TW)

(72) Inventor: Sean Liu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 126 days.

(21) Appl. No.: 13/832,061

(22) Filed: Mar. 15, 2013

(65) Prior Publication Data

US 2014/0148134 A1 May 29, 2014

(30) Foreign Application Priority Data

Nov. 29, 2012 (CN) .......................... 2012 1 0501809

(51) Int. Cl.
H04M 3/42 (2006.01)
H04W 4/20 (2009.01)
H04W 4/00 (2009.01)

(52) U.S. Cl.
CPC ................ *H04W 4/20* (2013.01); *H04W 4/008* (2013.01)

(58) Field of Classification Search
CPC ................................................... H04W 84/18
USPC ................. 455/41.1, 41.2, 414.1, 456.3, 419, 455/456.1; 370/338; 379/179
See application file for complete search history.

(56) References Cited

U.S. PATENT DOCUMENTS

| 6,674,403 | B2 * | 1/2004 | Gray et al. .................... 342/463 |
| 7,551,930 | B2 * | 6/2009 | Lempio et al. ............. 455/456.3 |
| 8,024,011 | B2 * | 9/2011 | Yeh ............................... 455/567 |
| 8,725,171 | B2 * | 5/2014 | Keating et al. ............. 455/456.3 |
| 8,831,507 | B2 * | 9/2014 | Murray et al. ............... 455/41.1 |
| 2011/0014929 | A1 * | 1/2011 | Moshfeghi et al. ........ 455/456.3 |

FOREIGN PATENT DOCUMENTS

CN 101848217 A * 5/2010

* cited by examiner

*Primary Examiner* — Amancio Gonzalez
(74) *Attorney, Agent, or Firm* — Bacon & Thomas, PLLC

(57) ABSTRACT

A mode switching and electronic sign-in system for a mobile device and a method thereof are provided. A mobile device performs detection of a sign-in device by a wireless network, and when detecting the sign-in device, the mobile device provides an electronic sign-in message. After the electronic sign-in message passes verification, the electronic sign-in message is recorded in the sign-in device. Meanwhile, because a result of detecting the sign-in device changes, the mobile device actively switches a corresponding mode of the mobile device, so as to achieve the technical efficacy of electronic sign-in performed through the mobile device of a user and automatic switching of the corresponding mode of the mobile device.

9 Claims, 3 Drawing Sheets

MODE SWITCHING AND ELECTRONIC SIGN-IN SYSTEM FOR MOBILE DEVICE AND METHOD THEREOF

BACKGROUND OF THE INVENTION

1. Field of the Invention

The present invention relates to a mode switching and electronic sign-in system and a method thereof, and more particularly to a mode switching and electronic sign-in system for a mobile device and a method thereof.

2. Description of Related Art

For large conferences, such as an exhibition and a seminar, the number of those intending to attend a conference is generally counted through registration, so that an organization hosting the conference may estimate the number of participants and accordingly prepare materials, meals, and venues. When the conference begins, the number of actual participants of the conference is precisely learned in a sign-in manner, so as to avoid deficiencies of the prepared materials, meals, and venues caused by attendance of unregistered persons.

However, for registration and sign-in work of the conference, when more people attend the conference, relatively more manpower needs to be consumed to process the registration and sign-in work, which makes the registration and sign-in work complex and may even cause careless omissions. That is, an unregistered person may still attend the conference, or most people do not actively check in, which causes inconvenience to management of attendees of the conference.

In view of the above problem, with the development of science and technology, currently, most conferences adopt digital registration. After the registration is completed, electronic card devices are correspondingly manufactured and provided for the registered personnel, so as to perform electronic sign-in work when the registered personnel attend the conference, thereby conveniently performing the registration and sign-in work. However, since the electronic card devices need to be manufactured, the cost is increased.

In addition, with the current popularization of mobile devices, a person attending a conference generally carries at least one mobile device. These mobile devices all have prompt functions, for example, a call ringtone, a short message prompt tone, and a mobile device startup tone. The prompt functions of the mobile devices tend to impede process of the conference. Though most mobile devices have a plurality of modes for users to conveniently make a choice according to different occasions, a user still needs to manually select a different mode, which causes inconvenience to the user.

To sum up, it can be known that in the prior art, the problem of an increased cost caused by additional electronic card devices required for electronic sign-in and inconvenient switching of the mode of the mobile device by the user exists for a long time, so it is necessary to propose improved technical means to solve this problem.

SUMMARY OF THE INVENTION

In view of the problem existing in the prior art, that is, the cost is increased by additional electronic card devices required for electronic sign-in and it is inconvenient for a user to switch a mode of a mobile device, the present invention discloses a mode switching and electronic sign-in system for a mobile device and a method thereof.

The mode switching and electronic sign-in system for a mobile device disclosed in the present invention includes: a sign-in device and a mobile device. The sign-in device further includes: a sending module, a receiving module, a verifying module, and a recording module. The mobile device further includes: a detecting module, a connecting module, a determining module, and a mode switching module.

The sending module of the sign-in device is used for sending a sign-in match signal; the receiving module of the sign-in device is used for receiving an electronic sign-in message; the verifying module of the sign-in device is used for verifying the electronic sign-in message; and the recording module of the sign-in device is used for recoding the electronic sign-in message when the electronic sign-in message passes the verification of the verifying module.

The detecting module of the mobile device is used for detecting a sign-in match signal by a wireless network; the connecting module of the mobile device is used for connecting to the sign-in device by a wireless network, and sending an electronic sign-in message to the receiving module when the sign-in match signal is detected by the detecting module; the determining module of the mobile device is used for determining a position of the mobile device according to the sign-in match signal when the mobile device detects the sign-in match signal; and the mode switching module of the mobile device is used for switching a corresponding mode to the position of the mobile device determined by the determining module.

The mode switching and electronic sign-in method for a mobile device disclosed in the present invention includes the following steps.

First, a mobile device detects of a sign-in match signal by a wireless network, where the sign-in match signal is sent by a sign-in device. Subsequently, when detecting the sign-in match signal, the mobile device determines a position of the mobile device according to the sign-in match signal. Subsequently, a corresponding mode of the mobile device is switched to the position of the mobile device. Subsequently, when the sign-in match signal is detected by the mobile device, the sign-in device is connected by a wireless network, and an electronic sign-in message is sent to the sign-in device. Subsequently, the sign-in device verifies the electronic sign-in message. Finally, when the electronic sign-in message passes the verification of the sign-in device, the electronic sign-in message is recorded.

The system and the method disclosed in the present invention are described as above, and the difference between the present invention and the prior art lies in that in the present invention, the mobile device detects of a sign-in match signal by a wireless network. When the sign-in match signal is detected, the mobile device connects to the sign-in device by a wireless network, so as to send the electronic sign-in message to the sign-in device, and the sign-in device may record the electronic sign-in message when the electronic sign-in message passes the verification, so as to conveniently perform electronic sign-in. Meanwhile, when the mobile device detects the sign-in match signal, the mobile device switches the corresponding mode of the mobile device correspondingly according to the position of the mobile device.

Through the foregoing technical means, the present invention may achieve the technical efficacy of electronic sign-in performed through the mobile device of a user and automatic switching of the corresponding mode of the mobile device.

BRIEF DESCRIPTION OF THE DRAWINGS

The invention will become more fully understood from the detailed description given herein below illustration only, and thus is not limitative of the present invention, and wherein.

DESCRIPTION OF THE EMBODIMENTS

Implementation manners of the present invention are illustrated in detail below with reference to accompanying drawings and embodiments, so the implementation procedure about how technical means is applied to the present invention to solve the technical problem and achieve the technical efficacy can be fully understood and implemented accordingly.

Figure 1:
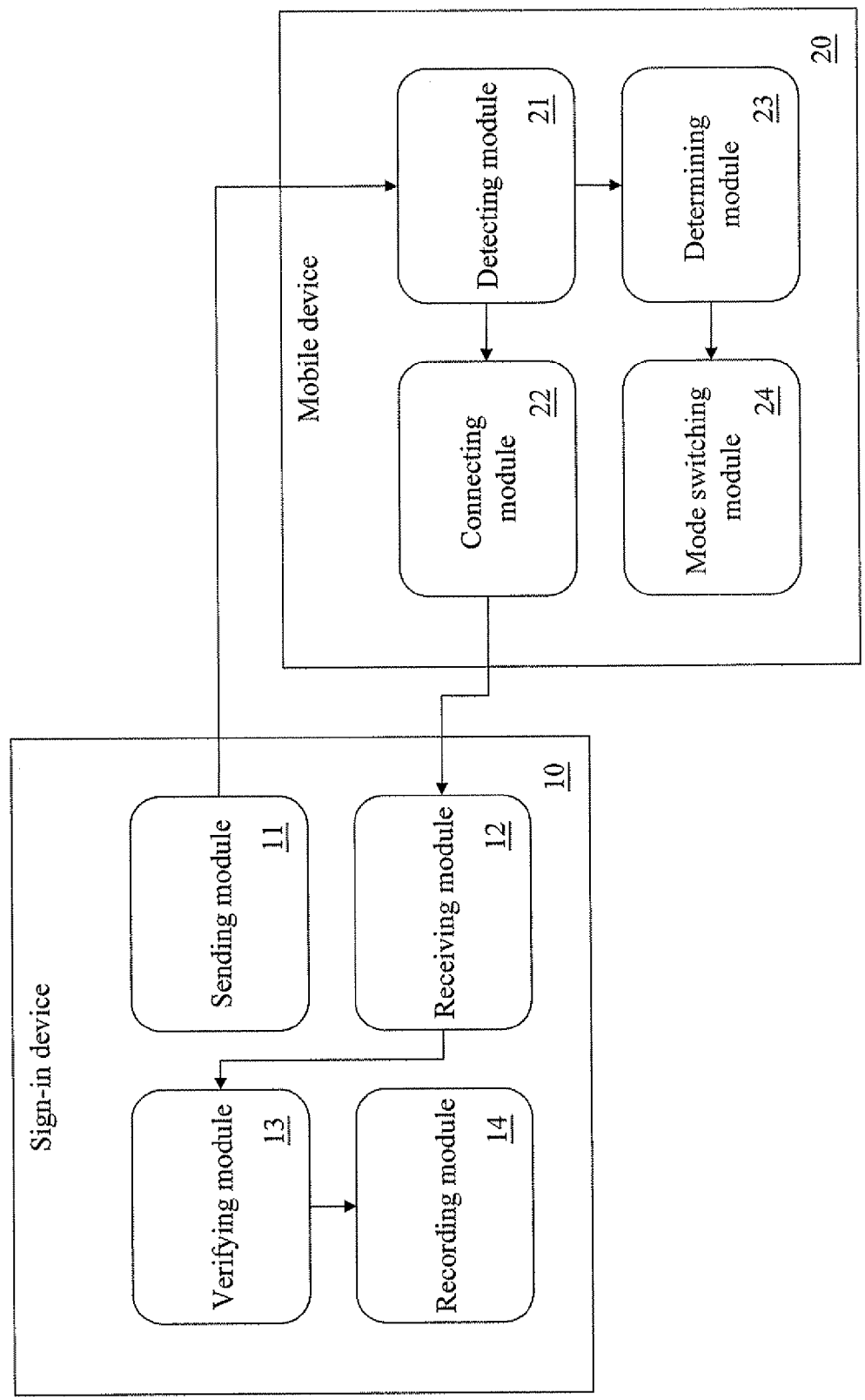
FIG. 1 is a block diagram of a mode switching and electronic sign-in system for a mobile device of the present invention.

A mode switching and electronic sign-in system for a mobile device disclosed in the present invention is first illustrated in the following. Referring to FIG. 1, FIG. 1 is a block diagram of a mode switching and electronic sign-in system for a mobile device of the present invention.

The mode switching and electronic sign-in system for a mobile device disclosed in the present invention includes: a sign-in device 10 and a mobile device 20. The sign-in device 10 further includes: a sending module 11, a receiving module 12, a verifying module 13, and a recording module 14. The mobile device 20 further includes: a detecting module 21, a connecting module 22, a determining module 23, and a mode switching module 24.

The mobile device 20 may be a notebook computer, a tablet computer, or a smart mobile phone. The detecting module 21 of the mobile device 20 performs detection of a sign-in match signal by a wireless network, and the sign-in match signal is sent by the sending module 11 of the sign-in device 10. Specifically, it is assumed that the wireless network is implemented through Bluetooth, that is, when detecting a newly added Bluetooth, the detecting module 21 of the mobile device 20 further determines whether to receive the sign-in match signal through the newly added Bluetooth. It is assumed that the wireless network is implemented through wireless fidelity (Wi-Fi), that is, when detecting a newly added Wi-Fi, the detecting module 21 of the mobile device 20 further determines whether to receive the sign-in match signal through the newly added Wi-Fi. Herein, examples are only taken for illustration, and the application scope of the present invention is not limited thereto. The sign-in device 10 may be a desktop computer, a notebook computer, a tablet computer, a smart mobile phone, or a reading device.

When the detecting module 21 of the mobile device 20 detects the sign-in match signal, that is, when the detecting module 21 of the mobile device 20 detects a newly added wireless network of the sign-in device 10, the connecting module 22 of the mobile device 20 may establish a connection to the sign-in device 10 in a corresponding wireless network. Specifically, when it is assumed that the detecting module 21 of the mobile device 20 detects a Bluetooth of the sign-in device 10, the connecting module 22 of the mobile device 20 may establish a connection to the sign-in device 10 by adopting the Bluetooth. When it is assumed that the detecting module 21 of the mobile device 20 detects a Wi-Fi of the sign-in device 10, the connecting module 22 of the mobile device 20 may establish a connection to the sign-in device 10 by adopting the Wi-Fi. Herein, examples are only taken for illustration, and the application scope of the present invention is not limited thereto.

After the connecting module 22 of the mobile device 20 establishes a connection to the sign-in device 10, the connecting module 22 of the mobile device 20 may provide an electronic sign-in message pre-stored in the mobile device 20 to the sign-in device 10. Or after an electronic sign-in message is input through a user interface provided by the mobile device 20, the connecting module 22 of the mobile device 20 provides the electronic sign-in message to the sign-in device 10. Herein, examples are only taken for illustration, and the application scope of the present invention is not limited thereto. The electronic sign-in message may be a combination of a user name and a user password, a combination of a user code and a user password, or a user verification code. Herein, examples are also taken for illustration, and the application scope of the present invention is not limited thereto.

Meanwhile, since the detecting module 21 of the mobile device 20 detects the sign-in match signal, the determining module 23 of the mobile device 20 may determine a position of the mobile device 20 according to the sign-in match signal. That is, the sign-in match signal may include position information, and the determining module 23 of the mobile device 20 may determine the position of the mobile device 20 according to the position information included in the sign-in match signal. Specifically, when it is assumed that the position information included in the sign-in match signal is "conference room", the determining module 23 of the mobile device 20 may determine that the position of the mobile device 20 is the "conference room". When it is assumed that the position information included in the sign-in match signal is "hall", the determining module 23 of the mobile device 20 may determine that the position of the mobile device 20 is the "hall". Herein, examples are only taken for illustration, and the application scope of the present invention is not limited thereto.

When the determining module 23 of the mobile device 20 determines the position of the mobile device 20, the mode switching module 24 of the mobile device 20 switches a corresponding mode of the mobile device 20 correspondingly according to the position of the mobile device 20 determined by the determining module 23 of the mobile device 20. Modes of the mobile device 20 include: a general mode, a silent mode, an indoor mode, an outdoor mode, a conference mode, and so on. Apart from being preset by the mobile device 20, the corresponding mode of the mobile device 20 may also be set by the user.

Specifically, when it is assumed that the mode set by the mobile device 20 is the "outdoor mode" and the position of the mobile device 20 determined by the determining module 23 of the mobile device 20 is the "conference room", the mode switching module 24 of the mobile device 20 switches the corresponding mode set by the mobile device 20, that is, the "outdoor mode", to the corresponding mode being the "silent mode" correspondingly according to that the position of the mobile device 20 determined by the determining module 23 of the mobile device 20 is the "conference room". Herein, examples are only taken for illustration, and the application scope of the present invention is not limited thereto.

After the receiving module 12 of the sign-in device 10 receives the electronic sign-in message provided by the connecting module 22 of the mobile device 20, the electronic sign-in message may be verified through the verifying module 13 of the sign-in device 10. That is, the verifying module 13 of the sign-in device 10 compares the electronic sign-in message with a standard message. When a comparison result is that the electronic sign-in message is consistent with the standard message, the electronic sign-in message can pass the verification of the verifying module 13 of the sign-in device 10. On the contrary, when the comparison result is that the electronic sign-in message is inconsistent with the standard message, the electronic sign-in message cannot pass the verification of the verifying module 13.

When the electronic sign-in message passes the verification of the verifying module 13 of the sign-in device 10, the recording module 14 of the sign-in device 10 records the electronic sign-in message, and the recording module 14 of the sign-in device 10 stores and records the electronic sign-in message in a manner of a database or a text file. Herein, examples are only taken for illustration, and the application scope of the present invention is not limited thereto. Thereby, it is confirmed that a user corresponding to the electronic sign-in message has signed in online.

Figure 2:
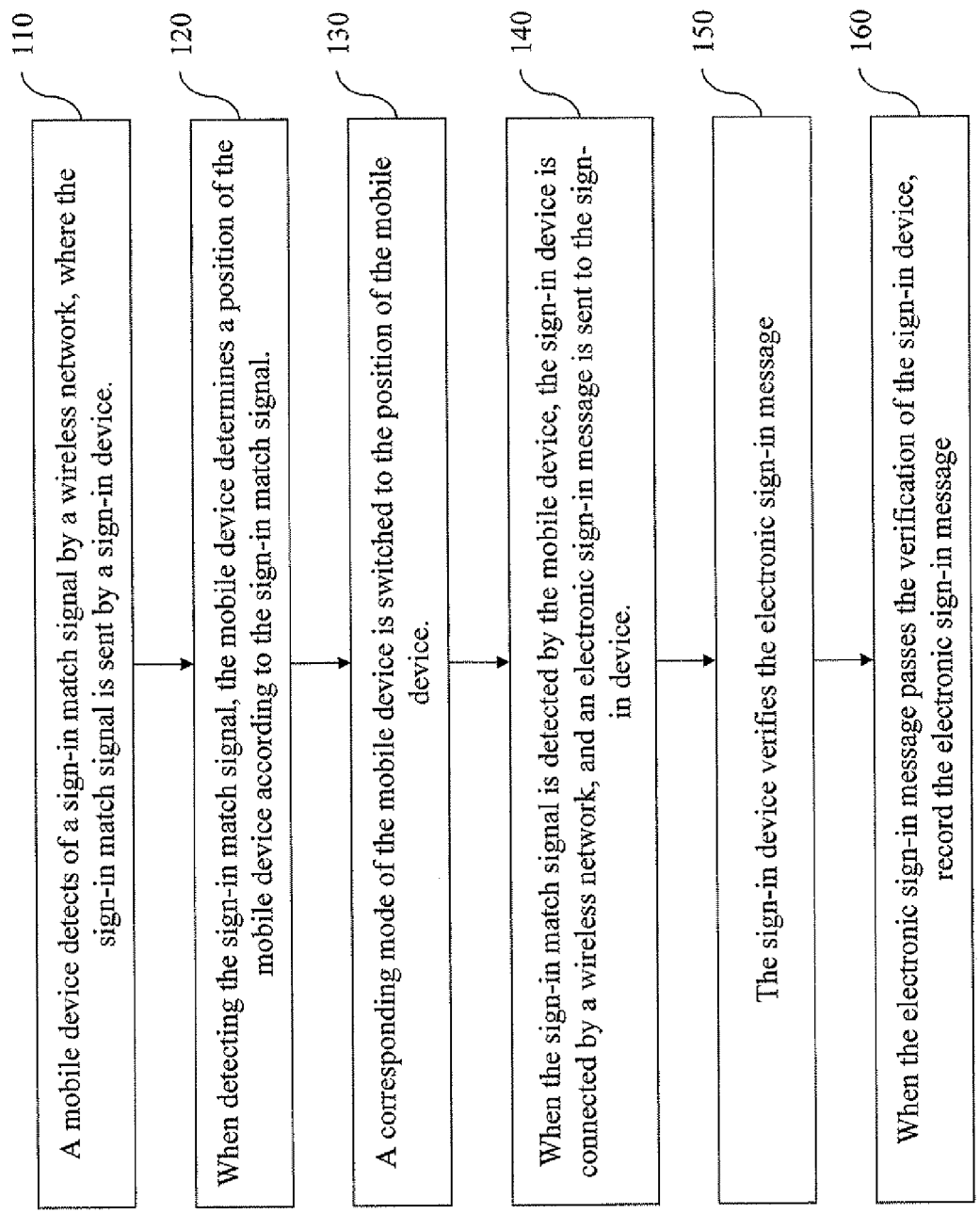
FIG. 2 is a flow chart of a mode switching and electronic sign-in method for a mobile device of the present invention.

Subsequently, a working mode and a process of the present invention are explained below through one embodiment. The following embodiment is described with reference to FIG. 1 and FIG. 2 in a synchronous manner. FIG. 2 is a flow chart of a mode switching and electronic sign-in method for a mobile device of the present invention.

Figure 3:
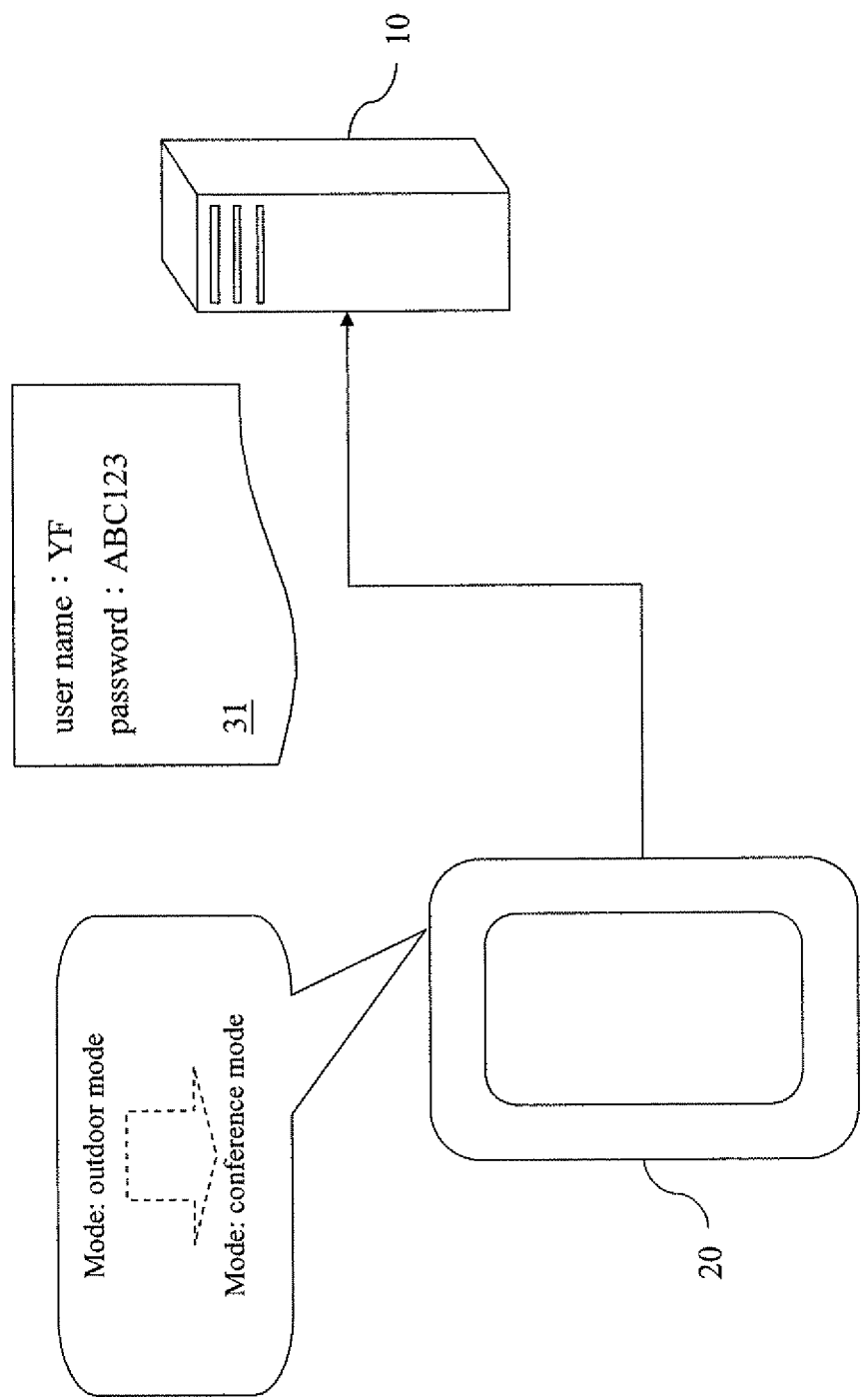
FIG. 3 is a schematic diagram of a mode switching and electronic sign-in architecture for a mobile device of the present invention.

Referring to FIG. 3, FIG. 3 is a schematic diagram of a mode switching and electronic sign-in architecture for a mobile device of the present invention.

A current mode of the mobile device 20 held by the user is the "outdoor mode", and an electronic sign-in message 31 pre-stored in the mobile device 20 is "user name: YF" and "password: ABC123". When the user moves from the outdoor to the indoor where the sign-in device 10 exists, the sending module 11 of the sign-in device 10 continuously sends a sign-in match signal that includes position information being "conference room", and the detecting module 21 of the mobile device 20 may detect a newly added Wi-Fi and determine to receive, through the newly added Wi-Fi, the sign-in match signal that includes the position information being "conference room" (Step 110).

When the detecting module 21 of the mobile device 20 detects the sign-in match signal, that is, when the detecting module 21 of the mobile device 20 detects the newly added Wi-Fi of the sign-in device 10, the connecting module 22 of the mobile device 20 may establish a connection to the sign-in device 10 in a corresponding Wi-Fi wireless network (Step 140).

After the connecting module 22 of the mobile device 20 establishes the connection to the sign-in device 10, the connecting module 22 of the mobile device 20 may provide the electronic sign-in message 31 pre-stored in the mobile device 20, that is, the "user name: YF" and the "password: ABC123", to the sign-in device 10 (Step 140).

Meanwhile, since the detecting module 21 of the mobile device 20 detects the sign-in match signal that includes the position information being "conference room", the determining module 23 of the mobile device 20 may determine, according to that the position information of the sign-in match signal is the "conference room", that the position of the mobile device 20 is the "conference room" (Step 120).

When the determining module 23 of the mobile device 20 determines that the position of the mobile device 20 is the "conference room", the mode switching module 24 of the mobile device 20 switches the corresponding mode of the mobile device 20 according to that the position of the mobile device 20 determined by the determining module 23 of the mobile device 20 is the "conference room". That is, the mode switching module 24 of the mobile device 20 switches the mode set by the mobile device 20, that is, the "outdoor mode", to the corresponding mode being the "conference mode" correspondingly (Step 130).

After the receiving module 12 of the sign-in device 10 receives the electronic sign-in message 31 provided by the connecting module 22 of the mobile device 20, that is, the "user name: YF" and the "password: ABC123", the electronic sign-in message 31, which is the "user name: YF" and the "password: ABC123", may be verified through the verifying module 13 of the sign-in device 10. That is, the verifying module 13 of the sign-in device 10 compares the electronic sign-in message 31, which is the "user name: YF" and the "password: ABC123", with a standard message (Step 150). If the standard message is "user name: YF" and "password: ABC123", for this embodiment, the electronic sign-in message 31, which is the "user name: YF" and the "password: ABC123", is consistent with the standard message, which is the "user name: YF" and the "password: ABC123", so that the electronic sign-in message 31, which is the "user name: YF" and the "password: ABC123", passes the verification of the verifying module 13 of the sign-in device 10.

When the electronic sign-in message 31, which is the "user name: YF" and the "password: ABC123", passes the verification of the verifying module 13 of the sign-in device 10, the recording module 14 of the sign-in device 10 records the "user name: YF" of the electronic sign-in message 31, and the recording module 14 of the sign-in device 10 stores and records the "user name: YF" of the electronic sign-in message 31 in a manner of a text file (Step 160). Thereby, it is confirmed that a user corresponding to the "user name: YF" of the electronic sign-in message 31 has signed in online.

To sum up, it can be known that the difference between the present invention and the prior art lies in that in the present invention, the mobile device performs detection by a wireless network, and when detecting the sign-in match signal, the mobile device establishes the connection to the sign-in device by a wireless network, so as to provide the electronic sign-in message to the sign-in device, and the sign-in device may record the electronic sign-in message after the electronic sign-in message passes the verification, so as to conveniently perform electronic sign-in. Meanwhile, when the mobile device detects the sign-in match signal, the mobile device switches the corresponding mode of the mobile device correspondingly according to the position of the mobile device.

Through the technical means, the problem existing in the prior art, that is, the cost is increased by additional electronic card devices required for electronic sign-in and it is inconvenient for the user to switch the corresponding mode of the mobile device, may be solved, thereby achieving the technical efficacy of electronic sign-in performed through the mobile device of the user and automatic switching of the corresponding mode of the mobile device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A mode switching and electronic sign-in system for a mobile device, comprising:
   a sign-in device, further comprising:
      a sending module, for sending a sign-in match signal;
      a receiving module, for receiving an electronic sign-in message;
      a verifying module, for verifying the electronic sign-in message; and a recording module, for recording the electronic sign-in message when the electronic sign-in message passes the verification of the verifying module; and a mobile device, further comprising:
- a detecting module, for detecting the sign-in match signal by a wireless network;
- a connecting module, for connecting to the sign-in device by a wireless network, and sending the electronic sign-in message to the receiving module when the sign-in match signal is detected by the detecting module;
- a determining module, for determining a position of the mobile device according to the sign-in match signal when the mobile device detects the sign-in match signal; and
- a mode switching module, for switching a corresponding mode to the position of the mobile device determined by the determining module.

2. The mode switching and electronic sign-in system for a mobile device according to claim 1, wherein the verifying module compares the electronic sign-in message with a standard message, and when the electronic sign-in message is consistent with the standard message, the electronic sign-in message passes the verification of the verifying module.

3. The mode switching and electronic sign-in system for a mobile device according to claim 1, the detecting module detects the sign-in match signal by a wireless network, wherein the wireless network is Bluetooth or Wi-Fi.

4. The mode switching and electronic sign-in system for a mobile device according to claim 1, wherein the connecting module establishes the connection to the sign-in device according to a wireless network detected by the detecting module.

5. The mode switching and electronic sign-in system for a mobile device according to claim 1, wherein the recording module stores and records the electronic sign-in message in a manner of a database or a text file.

6. A mode switching and electronic sign-in method for a mobile device, comprising the steps of:
- detecting a sign-in match signal by a wireless network, wherein the sign-in match signal is sent by a sign-in device;
- determining a position of the mobile device according to the sign-in match signal when the mobile device detects the sign-in match signal;
- switching a corresponding mode to the position of the mobile device;
- connecting to the sign-in device by a wireless network and sending an electronic sign-in message to the sign-in device when the sign-in match signal is detected by the mobile device; and
- verifying the electronic sign-in message by the sign-in device; and
- recording the electronic sign-in message when the electronic sign-in message passes the verification of the sign-in device.

7. The mode switching and electronic sign-in method for a mobile device according to claim 6, wherein the step of verifying the electronic sign-in message by the sign-in device is: comparing the electronic sign-in message with a standard message, and when the electronic sign-in message is consistent with the standard message, the electronic sign-in message passes the verification of the sign-in device.

8. The mode switching and electronic sign-in method for a mobile device according to claim 6, wherein in the step of detecting a sign-in match signal by a wireless network, wherein the wireless network is Bluetooth or Wi-Fi.

9. The mode switching and electronic sign-in method for a mobile device according to claim 6, wherein when the electronic sign-in message passes the verification of the sign-in device, the step of recording the electronic sign-in message is: storing and recording the electronic sign-in message in a manner of a database or a text file.

* * * * *